3,466,321
DERIVATIVES OF PHENYL-ACETIC ACID
Henri Morren, Forest, Belgium, assignor to UCB (Union Chimique-Chemische Bedrijven), S.A., Saint-Gilles-lez-Bruxelles, Belgium
No Drawing. Filed May 12, 1966, Ser. No. 549,462
Claims priority, application Great Britain, May 17, 1965, 20,743/65
Int. Cl. C07c 101/00, 101/18; A61k 25/00
U.S. Cl. 260—471                                         6 Claims

ABSTRACT OF THE DISCLOSURE

Compounds of the formula

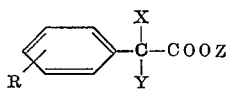

in which:

X is selected from the group consisting of a straight and a branched lower alkyl radical containing 1 to 5 carbon atoms;

Y is an aminated chain of the general formula

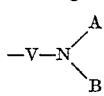

V being selected from the group consisting of a straight and a branched alkylene chain containing 1 to 4 carbon atoms, A and B, taken separately, being selected from the group consisting of H and lower alkyl, and, taken together with the nitrogen atom, forming a heterocyclic ring containing up to 5 carbon atoms, e.g. the morpholino, the piperidino or the pyrrolidino ring;

Z is selected from the group consisting of a straight and a branched lower alkyl radical and a lower aralkyl (e.g. benzyl, phenethyl, etc.) radical; and R is selected from the group consisting of a hydrogen atom, a halogen atom (Cl, Br, etc.) a lower alkyl group, a lower alkoxy (e.g. methoxy, ethoxy, etc.) radical and an amino group are suitable for use as anti-depressive agents.

---

The present invention is concerned with certain esters of phenyl-acetic acid, which are disubstituted in the alpha-position and which have considerable anti-depressive power, whereby they are eminently suitable for use as anti-depressive agents, more especially in the treatment of disorders which give rise to states of depression.

The compounds according to the present invention correspond to the general formula:

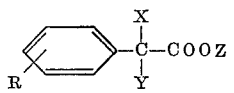

in which:

X is selected from the group consisting of a straight and a branched lower alkyl radical containing 1 to 5 carbon atoms;

Y is an aminated chain of the general formula

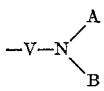

V being selected from the group consisting of a straight and a branched alkylene chain containing 1 to 4 carbon atoms, A and B, taken separately, being selected from the group consisting of H and lower alkyl, and, taken together with the nitrogen atom, forming a heterocyclic ring containing up to 5 carbon atoms, e.g. the morpholino, the piperidino or the pyrrolidino ring;

Z is selected from the group consisting of a straight and a branched lower alkyl radical and a lower aralkyl (e.g. benzyl, phenethyl, etc.) radical; and R is selected from the group consisting of a hydrogen atom, a halogen atom (Cl, Br, etc.) a lower alkyl group, a lower alkoxy, e.g. methoxy, ethoxy, etc.) radical and an amino group.

In the presently preferred embodiments thereof, compounds I are ethyl 2-[2-(N-diethylamino)-ethyl]-2-phenyl-lower alkanoates of the formula

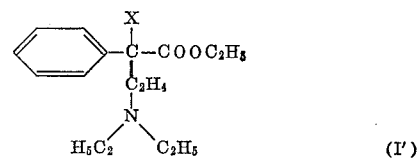

wherein X is as precedingly defined. Novel compounds of Formula I' comprise:

ethyl 2-[2-(N-diethylamino)-ethyl]-2-phenyl-propionate,
ethyl 2-[2-(N-diethylamino)-ethyl]-2-phenyl-pentanoate,
ethyl 2-[2-(N-diethylamino)-ethyl]-a-phenyl-hexanoate,
ethyl 2-[2-(N-diethylamino)-ethyl]-3-methyl-2-phenyl-butyrate, and
ethyl 2-[2-(N-diethylamino)-ethyl]-3-methyl-2-phenyl-pentanoate.

The compounds according to the present invention may be prepared by methods which are known per se. Thus, with the use of sodium hydride, it is possible to prepare the sodium derivative of a phenyl-acetic acid ester which is alpha-monosubstituted by a radical X, which is reacted with a halide of Y, this reaction being illustrated by the following equation:

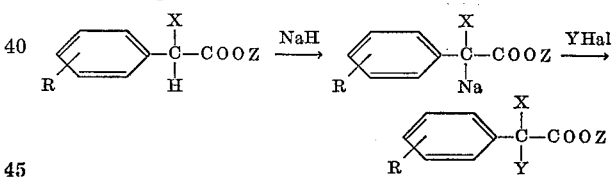

It is also possible to prepare, with the use of sodium hydride, the sodium derivative of a phenyl-acetic acid ester which is alpha-monosubstituted by a radical Y, which is reacted with a halide of X, this reaction being illustrated by the following equation:

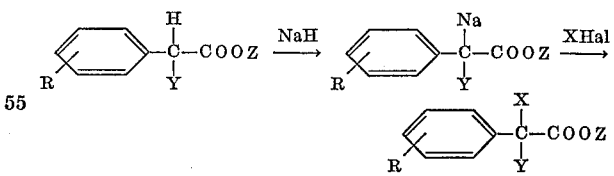

In these two equations, the symbols R, X, Y and Z have the same meanings as given above for compounds I, and Hal is a halogen atom.

Aqueous solutions of salts of the compounds of the present invention with pharmaceutically-acceptable inorganic and organic acids may be prepared very easily by the usual methods. Such salts comprise for example the hydrochlorides, hydrobromides, hydriodides, citrates, benzoates, tartrates, benzenesulfonates, etc. The salts have the same pharmacologic activity as the compounds I.

The anti-depressive properties of the compounds I are confirmed inter alia by the following comparative test data:

For this purpose, the method of Giurgea et al. (Med. Exp., 9, (1963), 249-62) is used. The examination is carried out on male rats. Subcutaneous administration of 10 mg. of tetrabenazine per kg. of animal induces a state which, within 2 hours of observation, is characterized by (a) the closing of the eyelids in 90% of the animals and (b) absence of reactivity in 98% of the animals. One hour before the injection of tetrabenazine, a dose of the compound being tested is administered to the animals. The minimum dose of the compound ($ED_{50}$ in mg. per kg. of animal) with which the opening of the eyelids and reactivity have become normal in at least 50% of animals is sought.

In this test, use is made of two compounds I which are respectively indicated as compound A and compound B:

compound A.—ethyl 2 - [2 - (N - diethylamino)-ethyl]-2-phenyl-butyrate; and
compound B.—ethyl 2 - [2 - (N - diethylamino)-ethyl]-2-phenyl-pentanoate, and they are compared with two commercial products (compounds C and D) which are known for their antidepressive activity, namely:

compound C.—N - (3-dimethylaminopropyl)-iminodibenzyl (imipramine); and
compound D.—N - (3 - methylaminopropyl)-iminodibenzyl (DMI).

In Table I below, the activities of the compounds tested are expressed in percentages of the activity of DMI, in order to show more clearly the superiority of the compounds according to the present invention. The activity of compound A is 200–300% of that of DMI (compound D) because the administration of 6–9 mg. per kg. of animal of compound A produces the same anti-depressive effect as 18 mg. of compound D per kg. of animal, i.e. $18/6-9 \times 100 = 200-300\%$.

TABLE I

| Compound: | Percentage of activity (DMI=100%) |
|---|---|
| A | 200–300 |
| B | 100–300 |
| C | 100 |
| D | 100 |

The following illustrative examples are given for the purpose of further elaborating the present invention.

Example 1.—Ethyl 2-[2-(N-diethylamino)-ethyl]-2-phenyl butyrate 0.1 mol of ethyl 2-phenyl-butyrate is dissolved in 50 ml. of anhydrous dimethyl formamide and a suspension of 2.4 g. of sodium hydride in 50 ml. of anhydrous toluene is added thereto. The reaction mixture is heated at 50–60° C. for 15 minutes. The reaction mixture is cooled to room temperature (20–30° C.) and 0.1 mol of 2-diethylamino-chloroethane dissolved in 25 ml. of toluene is added and the reaction mixture heated under reflux for 8 hours. The reaction mixture is taken up with 100 ml. of benzene and cooled to room temperature. It is extracted with a 2 N aqueous solution of hydrochloric acid. The aqueous acid solutions are washed with benzene and then rendered alkaline with a 2 N aqueous solution of sodium hydroxide. The mixture is extracted with benzene, the benzene extract is dried over anhydrous sodium sulphate, the solvent is evaporated in vacuo and the residue is distilled. The boiling point of the ethyl 2-[2-(N-diethylamino)-ethyl]-2-phenyl-butyrate obtained is 111–114° C./0.005 mm. Hg.

Example 2.—Ethyl 2-[2-(N-diethylamino)-ethyl]-2-phenyl-pentanoate

The preparation is carried out as in Example 1, starting from ethyl 2-phenyl-pentanoate. The boiling point of the ethyl 2-[2-(N-diethylamino)-ethyl]-2-phenyl-pentanoate obtained is 132–134° C./0.01 mm. Hg.

Example 3.—Ethyl 2-[2-(N-diethylamino)-ethyl]-2-phenyl-propionate

The preparation is carried out as in Example 1, starting from ethyl 2-phenyl-propionate. The boiling point of the ethyl 2-[2-(N-diethylamino)-ethyl]-2-phenyl-propionate obtained is 105–107° C./0.006 mm. Hg.

Example 4

The following compounds are prepared in analogous manner:

Ethyl 2-[2-(N-diethylamino)-ethyl]-3-methyl - 2 - phenyl-butyrate: B.P.: 133° C./0.01 mm. Hg.
Ethyl 2-[2-(N-diethylamino)-ethyl]-3-methyl - 2 - phenyl-pentanoate: B.P.: 97–98° C./0.001 mm. Hg (after three distillations).
Ethyl 2-[2-(N-diethylamino)-ethyl]-2-phenyl-hexanoate: B.P.: 124–126° C./0.01 mm. Hg.

The compounds of the invention are administered in per se conventional manner for this type of compound, e.g. orally in tablet form (tabletted with conventional tabletting agents) or in the soluble salt (e.g. hydrochloride) form by intravenous injection. A suitable dose is 10 to 100 mg. of compound I per kilogram of body weight, the number of doses per day being adjusted as required.

What is claimed is:

1. A compound selected from the group consisting of ethyl 2-[2-(N-diethylamino)-ethyl]-2-phenyl-propionate, ethyl 2-[2-(N-diethylamino)-ethyl]2 - phenylpentanoate, ethyl 2-[2-(N-diethylamino)-ethyl]-2 - phenyl-hexanoate, ethyl 2-[2-(N-diethylamino)-ethyl]-3-methyl-2-phenyl-butyrate, ethyl 2-[2-(N-diethylamino)-ethyl] - 3 - methyl-2-phenyl-pentanoate, and addition salts thereof with pharmaceutically-acceptable acids.

2. A compound according to claim 1, namely, ethyl 2-[2-(N-diethylamino)-ethyl]-2-phenyl-propionate.

3. A compound according to claim 1, namely, ethyl 2-[2-(N-diethylamino)-ethyl]-2-phenyl-pentanoate.

4. A compound according to claim 1, namely, ethyl 2-[2-(N-diethylamino)-ethyl]-2-phenyl-hexanoate.

5. A compound according to claim 1, namely, ethyl 2-[2-(N-diethylamino)-ethyl]-3-methyl-2-phenyl-butyrate.

6. A compound according to claim 1, namely, ethyl 2-[2-(N-diethylamino)-ethyl]-3-methyl-2-phenyl - pentanoate.

References Cited

FOREIGN PATENTS 210,102    8/1957    Australia.

LORRAINE A. WEINBERGER, Primary Examiner

L. A. THAXTON, Assistant Examiner

U.S. Cl. X.R.

260—247.2, 294.3, 326.3, 999